Aug. 1, 1961 P. C. GEBHARD 2,994,414
CORNER FASTENING FOR DOORS, WINDOWS AND THE LIKE
Filed Jan. 6, 1958

INVENTOR.
Paul C. Gebhard
BY
Pennie, Edmonds, Morton,
Barrows & Taylor
ATTORNEYS United States Patent Office 2,994,414
Patented Aug. 1, 1961

2,994,414
CORNER FASTENING FOR DOORS, WINDOWS AND THE LIKE
Paul C. Gebhard, 2426 West Lake Ave., Oceanside, N.Y.
Filed Jan. 6, 1958, Ser. No. 707,153
7 Claims. (Cl. 189—36)

The present invention relates to the construction of doors, windows and the like, and more particularly to a novel and improved corner fastening, for use in combination with mitered frame sections.

In the construction of storm doors, storm windows, etc., formed with framing members of hollow cross section, such as extruded aluminum sections, it is conventional to join a plurality of framing sections or rails at mitered corner joints, by means of corner fastening devices, such as corner keys, gussets and the like. Heretofore, substantial difficulties have been experienced in connection with the corner assemblies of doors, windows, etc., in that the corners tend to loosen up after a period of time, causing the door, window or other structure to lose its original shape and rigidity. Such difficulties are particularly acute where extruded aluminum framing rails are used in the construction, since aluminum is a relatively soft and easily deformable material, and the difficulties are compounded in the construction of aluminum storm doors, for example, where the entire weight of the structure is supported by hinges along one side and the corner joints are subjected to repeated stresses when the door is opened and closed in normal use. Heretofore, various attempts have been made to provide corner assemblies having adjustable connecting means therein, whereby loosening of the corner joints may be remedied from time to time. However, insofar as I am aware, none of the prior arrangements have been practical and commercially satisfactory.

Accordingly, the present invention seeks to provide a novel, improved and wholly practical arrangement for securing hollow framing rails at a mitered joint in a manner such that the joint has great strength, maintains the framing rails in proper alignment, and permits the joint to be taken up or tightened from time to time, whenever necessary. And, while the invention is not necessarily thus limited, it is particularly useful in door structures and the like formed of hollow extruded framing rails.

In accordance with one aspect of the invention, a new corner assembly combination is provided, which comprises a pair of hollow framing rails having mitered ends, butted together along a miter axis, and a novel corner fastening comprising adjustable tension means received within the framing rails and engaging the respective rails on opposite sides of the miter axis. The tension means is adjustable by means of a screw or the like, accessible from the exterior of the assembly, and means are provided which are operative or effective, in conjunction with the adjustable tension means, to maintain the butted framing rails in proper registry or alignment.

In one specific form of the invention, the adjustable tension member comprises a flexible element which spans the miter axis and engages the respective framing rails on opposite sides of the axis. An adjusting screw disposed substantially along the miter axis is operative to deflect the tension member in a direction along the miter axis and thereby draw the framing rails tightly together. The adjusting screw is also connected to an aligning member, which engages the respective framing rails on opposite sides of the miter axis and prevents relative displacement of the rails in the direction of the miter axis.

Another important feature of the invention resides in the provision of a corner assembly combination of the type set forth above, in which a novel and improved fastening device is received internally of the framing rails, in spanning relation to the mitered joint, the fastening device comprising adjustable tension means for drawing the framing rails together at the outer corner, adjustable compression means for urging the rails together at the inner corner, and a single adjusting means, accessible from the exterior of the corner assembly, for simultaneously adjusting the tension and compression means.

Thus, conventional extruded framing rails have relatively widely spaced inner and outer walls which, when the rails are butted together at a mitered joint, form, in effect, a pair of spaced corners. The new device, being received within the hollow rails, acts upon the outer corner from inside the corner angle and upon the inner corner from outside the corner angle. In the assembled corner structure, the framing rails are maintained in compression, at the mitered joint. However, such compression is advantageously obtained by means of an adjustable tension member acting on the outside corner and an adjustable compression member acting on the inside of the corner.

For a better understanding of the invention and for a discussion of other advantageous features thereof, reference should be made to the following description and to the accompanying drawing, in which.

Figure 3:
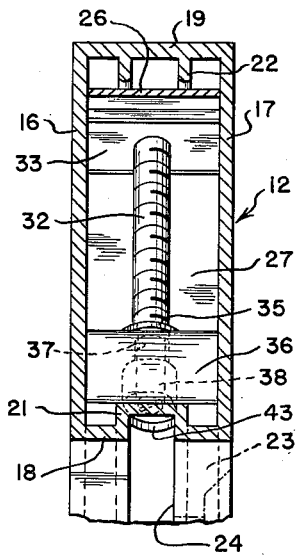
Figure 2:
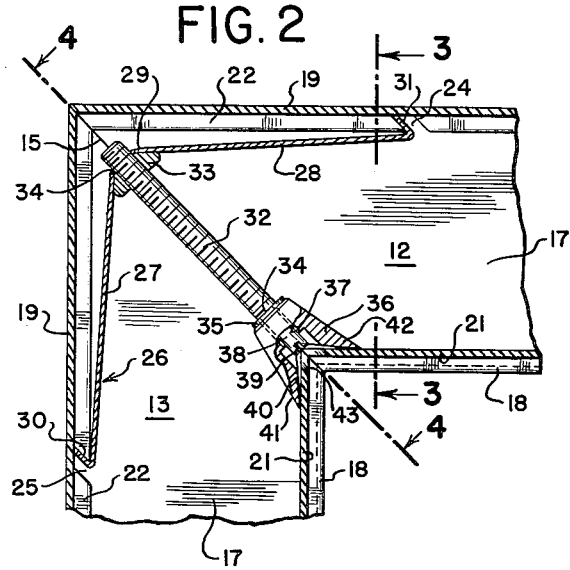
FIG. 2 is an enlarged fragmentary cross sectional view of a corner assembly combination constructed in accordance with the invention.
Figure 4:
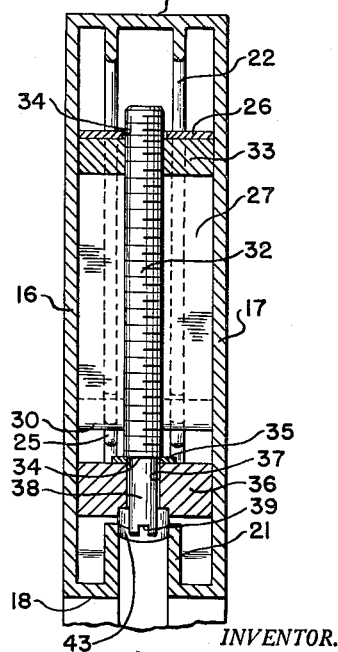
Figure 5:
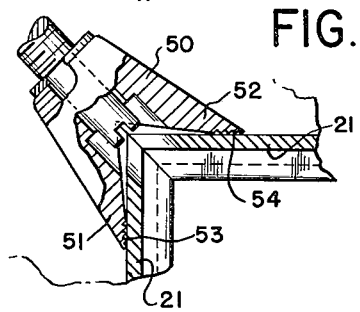

FIGS. 3 and 4 are cross sectional views taken along lines 3—3 and 4—4 of FIG. 2; and FIG. 5 is an enlarged fragmentary cross sectional view of a modified form of the invention.

Figure 1:
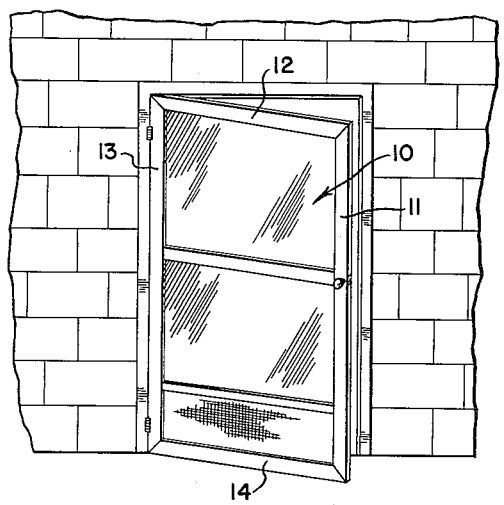
FIG. 1 is a perspective view of a door structure incorporating the features of the invention.

Referring now to the drawing, the reference numeral 10 designates generally a door, such as a storm door formed of extruded aluminum framing rails, which may be considered illustrative of an advantageous use of the invention. The door 10 of FIG. 1 comprises a plurality of framing rails 11—14 disposed in the form of a rectangle and connected together at mitered joints.

In accordance with the invention, the framing rails are secured together, at the mitered joints, by a novel corner assembly combination of the type shown in FIG. 2. Thus, a pair of hollow framing rails, such as rails, 12, 13 are provided with mitered ends, usually cut at an angle of 45°, which are butted together along a miter axis 15. In the illustrated assembly, the framing rails 12, 13 are of identical cross section, so that the end faces of the rails, at a 45° miter angle, are of identical size and configuration, permitting the rails to be butted together at the joint in substantially perfect registry, to form a right angle corner.

As shown best in FIGS. 2 and 3, the rails 12, 13 comprise a pair of spaced front and back walls 16, 17 and spaced inner and outer walls 18, 19 forming a hollow cavity of generally rectangular configuration. The inner and outer walls 18, 19 may be provided with integral internal webs 21, 22, for improving the beam strength of the rails and for other purposes to be described, and the inner webs 21 may define, in part, a groove or channel for receiving a screened or glazed sash, for example. The rails may also or alternatively be provided with a flange 23 projecting from the inner wall 18 and having a surface 24 for supporting a sash.

As shown in FIG. 2, the webs 22, along the outer rail walls 19, are provided with notches 24, 25. The notches 24, 25 are advantageously disposed at an acute angle to the outer walls 19 and open away from the mitered ends of the rails. The notches 24, 25 are also advantageously spaced back from the pointed ends of the rails a distance approximately equal to the spacing between the inner and outer walls 18, 19. And, although the exact location of the notches is not deemed critical, it is best to locate them in a manner to facilitate the machining or other operations necessary to form the notches.

In accordance with one aspect of the invention a tension member 26, which is advantageously in the form of a strip of spring material, is engaged in the notches 24, 25 and adapted to be placed under tension to draw the rails together at the joint. The tension member 26 has leg portions 27, 28 disposed at an angle somewhat greater than 90° and joined in the center by a curved portion 29. At the ends of the legs 27, 28 are hook-like portions 30, 31, which are adapted to be received in the notches 24, 25 and interlockingly engaged with the webs 22.

As shown best in FIG. 2, the framing rails 12, 13 are secured together at the mitered joint by engaging the hook portions 30, 31 of the tension member 26 in the rail notches 24, 25 and placing the member 26 under tension. For this purpose, there is provided an adjusting screw 32, which threadedly engages a nut 33 of generally semi-cylindrical form and is adapted to be received in a suitable opening 34 in the curved portion 29 of the tension member. The arrangement is such that the curved nut 33 is adapted to press against the inside of the curved portion 29, urging the curved portion outwardly along the miter axis to place the member under tension.

In the illustrated form of the invention, the adjusting screw 32 has a shoulder 34 adjacent its inner end which seats agansit a thrust washer 35 supported by a combined compression member and aligning block 36. The block 36 has an opening 37 therethrough, in which is received the head portion 38 of the adjusting screw, and the head portion has means therein, such as a screwdriver slot 39, for rotating the screw.

In accordance with one aspect of the invention the compression and aligning block 36 is provided with a V-shaped notch 40, defining spaced legs 41, 42 adapted to be positioned on opposite sides of the miter axis and to press against the webs 21 projecting from the inner walls 18 of the framing rails. Advantageously, the V-shaped notch 40 has an included angle slightly smaller than the corner angle at which the framing rails 12, 13 are disposed. Thus, where the corner angle is 90°, the notch angle may be in the order of 85°. In addition, the dimensions of the block 36 and notch 40 are such that the legs 41, 42 engage the webs 21 at points spaced from the miter axis.

As shown in FIG. 2, the inner walls 18 of the framing rails 12, 13 are provided with semi-circular recesses 43 disposed along the miter axis and arranged, when the rails are butted together, to define an opening for the reception of a tool, such as a screwdriver. This provides ready access to the adjusting screw from the inside corner of the joint, as will be apparent.

To assemble the corner structure, the fastening device, comprising tension member 26, nut 33, adjusting screw 32 and block 36, is inserted in one of the framing rails, so that one of the hooks of the tension member is received in the web notch of the rail. The other rail member is then applied over the parts of the fastening device and brought into butting engagement with the first rail member, causing the other hook of the tension member to engage the web notch of the second framing member. At this time, the corner structure is assembled substantially as shown in FIG. 2, except that the various parts are loosely connected.

To complete the joint, the fastening device is tightened, and this is accomplished by inserting a screwdriver or like tool through the inside corner opening, formed by recesses 43, and rotating the adjusting screw 32. Preferably, the adjusting screw 32 has a left hand thread, so that clockwise rotation of the screw will cause the nut 33 to be advanced outwardly, toward the end of the screw. The adjusting screw 32 is rotated to advance the nut outwardly, toward the outer corner of the joint, and this places tension on the tension member 26, forcebaly urging the outer portions of the framing rails together at the corner. In the illustrated form of the invention the size and shape of the tension member 26 is advantageously such that the tightening forces applied by the tension member are substantially parallel to the outer walls 19 of the framing rails.

The application of tension to the tension member 26 causes a reacting force to be applied to the adjusting screw 32, urging the screw inwardly, in the direction of its axis, toward the inside corner of the joint. The adjusting screw thus acts in compression against the block 36, causing the spaced legs 41, 42 of the block to press forceably against the rail webs 21, pressing the rails tightly together at the inside corner. Tightening of the adjusting screw thus simultaneously clamps the framing rails 12, 13 together, by means of forces applied to the rails adjacent the inner and outer corners of the joint. The clamping forces are thus directed with maximum effectiveness to areas providing greatest leverage for resisting external forces applied to the joint.

As one of the important features of the invention the butted framing rails at a mitered joint are automatically aligned and held against displacement along the miter axis by the fastening device. Thus, in the illustrated form of the invention, the inner corner of the joint is received in the V-shaped notch 40 of the block 36. The notch 40 closely conforms to the corner angle (advantageously being about 5° smaller, for improved clamping) so that the apex of the inner corner is substantially in the apex of the notch. Accordingly, as the fastening device is tightened, by appropriate rotation of the adjusting screw 32, the butted rails are displaced relatively along the miter axis, if necessary, to bring the mitered ends into substantially exact face to face relation and to retain them in such relation by preventing further relative displacement along the miter axis.

In accordance with another aspect of the invention, the tension member 26, nut 33 and block 36 (or one or more of them) are of substantially the same width as the space between the front and back walls 16, 17 of the framing rails. In addition, each of these members traverses or spans the miter axis, so as to be disposed between the front and back walls of both of the framing rails forming a corner assembly. Accordingly, relative displacement of the framing rails out of the plane normally defined thereby, which may be referred to as lateral displacement for convenience of reference, is prevented. Advantageously, elements traversing the miter axis are spaced apart and located adjacent the inner and outer corners of the joint, for maximum leverage against twisting. And, in this respect, in the illustrated form of the invention, the block 36 is disposed at the inner corner while the nut 33 and tension member 26 are located adjacent the outer corner.

In the modified form of the invention shown in FIG. 5, a combined compression and aligning block 50 similar to the block 36 of FIGS. 2-4, is provided, adjacent the outer ends of the spaced legs 51, 52 thereof, with serrations or teeth 53, 54. With the modified fastening device, which otherwise may be the same as that shown in FIGS. 2-4, the teeth 53, 54 provide a substantial gripping action, when the fastening device is tightened, by reason of the teeth biting into the softer material of the rail webs 21.

The new corner assembly combination represents a substantial improvement over known arrangements in that an extremely strong joint connection is afforded, and at the same time the butted rails are brought into and rigidly held in desired aligned relationship to each other. One of the important features of the invention resides in the provision, in a corner assembly combination, of an improved fastening device which acts upon butted, hollow framing members, adjacent the inner and outer corners of the joint, to provide maximum leverage for resisting external forces. The improved arrangement is most advantageously realized by providing a first member which acts in tension adjacent the outer corner and a second member which acts in compression adjacent the inner corner of the joint. A single adjusting screw is operative to place the respective members under tension and compression, so that assembly of the joint may be accomplished swiftly and with high efficiency by tightening a single screw.

Perhaps the most important practical feature of the invention resides in the fact that the fastening device may be readily adjusted from time to time to tighten joints which may become loose after continued use. In this respect, it will be understood that extruded aluminum framing rails, commonly used in the construction of doors, windows, etc., are relatively soft and frequently are overstressed from time to time, in normal use. Heretofore, the weakest part of a door, window or like structure has been the corner joint, and, particularly in the case of aluminum storm doors, for example, the doors begin to sag after a short period of use and frequently become unusable. The new corner assembly combination permits the joints to be tightened up several times, if necessary, even where considerable permanent deformation of some of the parts has occurred. Thus, in experimental tests carried out on the new corner assembly combination, sufficient force has been applied to joined rail members to open the joint as much as ¼ inch, which is much more severe than would be encountered in normal use. After the force was released, the joint could be immediately closed by tightening the adjusting screw 32. Moreover, the experimental tests demonstrated that, even after the application of such an extraordinary force and the retightening of the joint by the adjusting screw 32, the joint could again be extraordinarily stressed and retightened, and the process repeated a few more times before the material of the framing rails finally failed.

The fastening device incorporated in the new corner assembly combination greatly facilitates the assembly of frame structures such as doors, windows, etc., in that, following initial subassembly of the fastening device, a corner joint, a simple three-part assembly, which can be snapped together and tightened with a single screw.

Another advantageous feature of the invention resides in the fact that the adjusting screw is accessible from the inside corner of the joint, through a small opening. Thus, the single small opening, unobtrusively located at the inside corner, is the only opening required in the otherwise totally enclosed joint. The entire fastening mechanism is thus effectively concealed, yet readily accessible for necessary adjustments.

It will be understood, of course, that the invention, while particularly applicable to storm doors and the like of extruded aluminum construction, may have a wide variety of structural uses, which will make themselves readily apparent to persons skilled in the art, and the invention may take a variety of forms, of which the herein described forms are merely illustrative. Moreover, the invention is believed to reside in the fastening device per se, as well as in certain combinations thereof with structural components. Accordingly, reference should be made to the appended claims in determining the full scope of the invention. In the claims, the term "flexible" as applied to a tension member, is intended to include such obvious equivalents as articulated members, wherein two or more elements, which may or may not be flexible in themselves, are connected at a hinged joint.

I claim:

1. In a corner joint combination comprising a pair of hollow framing rails having spaced front and back walls and spaced inner and outer walls and having mitered ends butted together along a miter axis, and a corner fastening securing the framing rails in butted relation, the improvement in said corner fastening comprising a tension member formed of a strip of spring material having a width substantially equal to the space between said front and back walls and having means adjacent each end engaging the outer wall of a framing rail, said tension member being received within said framing rails and traversing said miter axis, an aligning block received within said framing rails and having a width substantially equal to the space between said front and back walls, said aligning block having a V-shaped notch therein received over the inside corner of the joint formed by said inner walls, and an adjustable member disposed generally along said miter axis and interconnecting said tension member and aligning block, said adjustable member being adjustable to move the center portion of said tension member away from said aligning block whereby to place said tension member under desired tension.

2. The corner joint combination of claim 1, in which the angle of the V-shaped notch in said aligning block is less than the corner angle formed by said inner walls.

3. The corner joint combination of claim 1, in which the adjustable member is a screw, and said framing rails define an opening disposed generally along said miter axis and exposed at one of the corners of the joint providing access to said screw for adjustment.

4. In a corner joint combination comprising a pair of hollow framing rails having spaced front and back walls and spaced inner and outer walls and having mitered ends butted together along a miter axis, and a corner fastening securing the framing rails in butted relation, the improvement in said corner fastening comprising a tension member formed of a strip of spring material having means adjacent each end engaging the outer wall of a framing rail, said tension member being received within said framing rails and traversing said miter axis, an aligning block received within said framing rails and having a V-shaped notch therein received over the inside corner of the joint formed by said inner walls, and an adjustable member acting between said aligning block and said tension member and applying tension to said tension member.

5. In a corner joint combination comprising a pair of hollow framing rails having spaced front and back walls and spaced inner and outer walls and having mitered ends butted together along a miter axis, and a corner fastening securing the framing rails in butted relation, the improvement in said corner fastening comprising a tension member engaging outer walls of the respective framing rails and traversing said miter axis, an adjusting screw applying tension to said tension member, and means acted upon by said adjusting screw and engaging said framing rails on opposite sides of said miter axis preventing relative displacement of said framing rails along said miter axis.

6. In a corner joint combination comprising a pair of hollow framing rails having mitered ends butted together along a miter axis, and a corner fastening securing the framing rails in butted relation, the improvement in said corner fastening comprising a tension member housed within said hollow rails spanning the miter axis and engaging the respective framing rails on opposite sides of said miter axis, and means applying tension to said tension member including an aligning block received within said hollow rails and engaging the rails on opposite sides of said miter axis.

7. A corner joint comprising, in combination, a pair of hollow framing rails having mitered ends butted together along a miter axis, said rails having spaced front and back walls and spaced inner and outer walls, tension means engaging the outer walls of the butted rails on opposite sides of said miter axis, adjustable means applying tension to said tension means, and aligning means acted upon by said adjustable means and engaging the inner walls of said rails on opposite sides of said miter axis preventing relative displacement of said rails along the miter axis.

References Cited in the file of this patent

UNITED STATES PATENTS

| | | |
|---|---|---|
| 909,055 | Bowers | Jan. 5, 1909 |
| 1,749,648 | Ray | Mar. 4, 1930 |
| 2,118,525 | Richardson | May 24, 1938 |
| 2,538,138 | Webster | Jan. 16, 1951 |
| 2,750,014 | Gordon | June 12, 1956 |